United States Patent Office 2,882,169
Patented Apr. 14, 1959

2,882,169

CHEESE PACKAGE

Elwood W. Kielsmeier, Fond du Lac, Wis., and Harold J. Buyens, Chicago, Ill., assignors to Swift & Company, Chicago, Ill., a corporation of Illinois No Drawing. Application September 28, 1955
Serial No. 537,282

4 Claims. (Cl. 99—178)

This invention relates in general to a method of inhibiting mold formation in cheese and more particularly to a method of packaging natural cheese to increase the mold free shelf life of the package and to improve the package thereby produced.

One of the most serious problems in the manufacturing and marketing of cheese in general and natural cheese in particular is that of preventing mold growth on the surface of the cheese. During the production and curing of natural cheese, contamination with mold and undesirable yeasts is often encountered, and these contaminants may then be found in the product on completion of the packaging operation. In addition mold development can occur during storage of the cheese at the point of purchase causing a substantial loss in the number of salable cheese packages. As a result, substantial losses to cheese producers are directly attributable to mold formation.

Since it is known that mold development requires the presence of oxygen, previous attempts at the solution of the problem of inhibiting mold formation have been directed toward the elimination of oxygen from the cheese package. Two of the better known methods of eliminating oxygen heretofore employed are vacuum packaging, and providing for "cling" between the packaging material and the product. "Cling" is the term used to denote a close and intimate contact between the cheese surface and the wrapping material. Theoretically, if the film is held in flat contact with all surfaces of the cheese, air cannot come in contact with the surface and thus mold formation should be prevented. Wrapping materials having good "cling" properties generally comprise plastic sheets coated with very thin films of a cling promoting substance.

An additional consideration in cheese packaging is the adverse effect which cheese oil can have on the protective properties of many packaging materials. The cheese oil in natural cheese is in suspension in the cheese and can be induced to collect on the surface of the product when the product is held without refrigeration. Since this oil or grease is exuded on the surface of the cheese, the material employed in wrapping the product must be resistant to its attack.

With many of the methods heretofore proposed, the inhibition of mold development by the avoidance of an oxygen containing atmosphere has not been entirely succesful. The presence of air pockets within the package and the incomplete "clinging" of the wrapping material to all surfaces of the cheese have resulted in conditions favorable to mold formation and a shortened shelf life of the product. Other wrapping materials have shown a lack of grease resistance, resulting in a loss of protection as the wrapper is attacked by the grease. It is therefore an object of the present invention to provide a method for packaging cheese in which mold is substantially prevented and intimate contact between the cheese and the packaging material is not required.

Another object of the present invention is to provide a mold free cheese package having a heat sealable wrapper which is characterized by differential gas transmission characteristics which obviate the necessity for cling in protecting against mold development.

Still another object is to provide a cheese package containing a mold inhibiting atmosphere resulting from the combination of the biological activity of the cheese with differential gas transmission characteristics of the nonclinging packaging film.

Additional objects if not specifically set forth herein will be readily apparent to one skilled in the art from the following detailed description of the invention:

It appears that natural cheese possesses a natural mold inhibition system which, if properly employed, can be used to protect pre-packaged cheese from mold growth. The mold inhibiting system present in the cheese will consume a limited amount of oxygen, forming harmless oxidation products. If the quantity of oxygen permitted to come in contact with the cheese is limited to an amount which may be entirely consumed by these natural inhibiting substances, mold formation will be prevented since no oxygen will remain to favor the injurious growth.

In accordance with the present invention mold formation in natural cheese is effectively inhibited by packaging the cheese in a wrapping material having desirable differential gas transmission characteristics, that is, the wrapper should be pervious to carbon dioxide and relatively impervious to the passage of oxygen. A wrapper comprising a continuous film of polyethylene enclosing the cheese and overlaid by a sheet of regenerated cellulose has been found to have the desired properties.

More specifically, it has been found that if natural cheese is completely enclosed and hermetically sealed in a flexible wrapper possessing desirable gas transmission characteristics, it is possible to maintain an atmosphere surrounding the cheese which is surprisingly well suited to the avoidance of mold formation. A material such as regenerated cellulose coated with a thin film of polyethylene is characterized by a low oxygen permeability and a relatively high rate of transmission of carbon dioxide. A packaging sheet comprising 300 MSAT cellophane or equivalent coated with about a .0015 in. film of polyethylene has been found preferable.

When natural cheese is hermetically sealed within the wrapping material of the present invention, the oxygen already present within the package is exhausted by the biological processes of the cheese, forming carbon dioxide which easily escapes by diffusion through the package wall. The limited oxygen permeability of the wrapper provides for the gradual diffusion of this gas into the package, supplying sufficient oxygen to sustain this biological activity of the cheese and resultant production of carbon dioxide but not enough oxygen to promote mold development. The resulting atmosphere within the cheese package is high in carbon dioxide content but relatively devoid of oxygen. The rapid rate of diffusion of the carbon dioxide out of the package as opposed to the slow rate of diffusion of oxygen in the opposite direction in effect maintains a partial vacuum within the package, although this vacuum is insufficient to cause substantial contraction of the wrapper. It should be apparent therefore that in the practice of this invention oxygen is allowed to diffuse at a limited rate into the package and that the complete exclusion of oxygen from the surface of the cheese is neither required nor desirable. An important consideration is that the rate of transmission of oxygen into the cheese containing area be less than the rate at which the cheese itself is able by biological activity to utilize the oxygen. These conditions will insure the continuous flow of carbon dioxide out of the package.

To more clearly illustrate the effectiveness of the packaging material of this invention as an inhibitor of mold growth, storage tests were run comparing mold free shelf life of control samples with cheese packaged in accordance with the method of this invention. A number of packages containing different types of cheese were prepared, using the wrapping material of this invention. These samples along with control samples which were enclosed in the same type of film were subjected to a shelf life test. The test packages were hermetically sealed, the controls, unsealed. The samples were stored in a room at a temperature of about 45° F. and relative humidity of about 50% for an extended period of time. The following table illustrates the improvement in mold free shelf life afforded by the hermetically sealed package of this invention.

TABLE I

| Type of Cheese | No. Packages | Shelf Life Data | | | Control | |
| --- | --- | --- | --- | --- | --- | --- |
| | | After 30 days, percent Moldy | After 60 days, percent Moldy | After 90 days, percent Moldy | After 30 days, percent Moldy | Numerical Ratio |
| 1. Brick | 30 | 0 | 0 | 0 | 93 | 28/30 |
| 2. Brick | 25 | 0 | 4 | 4 | 96 | 24/25 |
| 3. Brick | 30 | 0 | 0 | 0 | 97 | 29/30 |
| 4. Brick | 30 | 3 | 6 | 6 | 97 | 29/30 |
| 5. Brick | 28 | 0 | 0 | 0 | 96 | 27/28 |
| 6. Brick | 20 | 0 | 0 | 0 | 100 | 20/20 |
| 7. Brick | 20 | 0 | 0 | 0 | 100 | 20/20 |
| 8. Brick | 24 | 0 | 0 | 5 | 96 | 23/24 |
| 9. Swiss | 15 | 0 | 12 | 12 | 93 | 14/15 |
| 10. Swiss | 24 | 4 | 4 | 4 | 96 | 23/24 |
| 11. Swiss | 90 | 6 | 11 | 15 | 95 | 85/90 |
| 12. Swiss | 20 | 0 | 0 | 25 | 100 | 20/20 |
| 13. Swiss | 59 | 1 | | | 96 | 57/59 |
| 14. American | 50 | 2 | 2 | 2 | 96 | 48/50 |
| 15. American | 30 | 6 | 15 | | 97 | 29/30 |
| 16. American | 36 | 3 | | | 97 | 35/36 |

Although other materials having equivalent properties may of course be employed, the packaging material found superior in the present invention comprises a sheet of regenerated cellulose continuously coated with a thin film of polyethylene. For most cheese, the wrapper should have a minimum carbon dioxide permeability greater than the maximum oxygen transmission rate. Packaging materials which have been found most satisfactory in the practice of this invention have an oxygen permeability of from .005 to 0.25 cc. per 100 sq. in. per 24 hours when measured at 73° F. and 760 mm. pressure. The gas transmission characteristics for the films of various thickness were determined in an empirical manner, the test being conducted under normal atmospheric conditions at the existing atmospheric pressure. No attempt was made to adjust the testing area to an Hg-oxygen differential pressure. A typical wrapping material of 300 MSAT cellophane coated with a 2 mil film of polyethylene transmits oxygen at the rate of about 0.019 cc. per 100 square inches of film during a 24 hour period in an atmosphere at about 73° F. and 760 mm. pressure. The polyethylene coating on the film which encloses the cheese and may be in loose contact with the cheese surface but which has no "cling" to the surface of the cheese may vary in thickness between 0.0005 in. and 0.0025 in. and satisfy the gas transmission requirements of the instant invention. It has been found, however, that a wrapper having a continuous polyethylene coating of about 0.0015 in. is preferable.

It is advisable in the interest of efficiency in the packaging operation that the wrapper be flexible, even at refrigeration temperatures, pliable and heat sealable, in order that a substantially air tight package may be rapidly formed. It has been found that cheese packages produced in the manner of the present invention will not develop mold growth even upon prolonged storage under conditions favorable to mold growth, nor is there any evidence of breakdown in the packaging material as a result of cheese grease. Aside from the packaging material, no particular structure with respect to the form or shape of the package is critical. Any known method of forming pliable wrapping material about an article so as to achieve a substantially airtight package may be employed.

Obviously many modifications and variations of the invention as hereinbefore set forth may be made without departing from the spirit and scope thereof, and therefore, only such limitations should be imposed as are indicated in the appended claims.

We claim:
1. A mold proof cheese package which comprises: natural cheese enclosed in a flexible pliable heat sealable wrapper consisting essentially of a sheet of regenerated cellulose continuously coated with a thin film of polyethylene said wrapper having an oxygen permeability of not more than about 0.25 cc. per 100 square inches of film in a 24 hour period when measured at about 70° F. and 760 mm. pressure and a carbon dioxide permeability at least greater than the maximum oxygen transmission rate.

2. A cheese package having substantial mold resistance properties which comprises: natural cheese enclosed in a flexible heat sealable polyethylene coated plastic wrapper having an oxygen permeability of from .005 to 0.25 cc. per 100 square inches of film in a 24 hour period when measured at about 70° F. and 760 mm. pressure and a carbon dioxide permeability at least greater than the maximum oxygen transmission rate.

3. A cheese package comprising natural cheese enclosed in a heat sealable transparent wrapper consisting of a cellophane sheet continuously coated with a polyethylene film of from about 0.0005 inch to about 0.0025 inch and having an oxygen permeability of not more than 0.25 cc. per 100 square inches of film in 24 hours and a carbon dioxide permeability at least greater than the maximum oxygen transmission rate, said wrapper permitting the escape of carbon dioxide gas generated by the cheese and allowing only sufficient oxygen to enter said package to maintain the biological activity of said cheese.

4. A mold proof cheese package containing natural cheese in a mold-inhibiting atmosphere resulting from the combination of the biological activity of the cheese with differential gas transmission characteristics of a non-clinging wrapper, said non-clinging wrapper consisting essentially of 300 MSAT cellophane coated with a film of polyethylene of about .0005 to about .0025 inch thickness such that the oxygen permeability is not more than 0.25 cc. per 100 square inches of film in 24 hours and a carbon dioxide permeability at least greater than the maximum oxygen transmission rate.

References Cited in the file of this patent

UNITED STATES PATENTS

| 2,606,120 | Cherepow et al. | Aug. 5, 1952 |
| 2,686,744 | Cornwell | Aug. 17, 1954 |
| 2,714,557 | Mahaffy | Aug. 2, 1955 |
| 2,726,171 | Morf | Dec. 6, 1955 |

FOREIGN PATENTS

| 551,044 | Great Britain | Feb. 5, 1943 |
| 661,835 | Great Britain | Nov. 28, 1951 |